US008314701B2

(12) United States Patent
Grieco et al.

(10) Patent No.: US 8,314,701 B2
(45) Date of Patent: Nov. 20, 2012

(54) METHOD FOR THE TRACEABILITY OF PLANTS

(75) Inventors: Pasquale Domenico Grieco, Matera (IT); Gianpiero Vigo, Milan (IT)

(73) Assignee: Metapontum Agrobios S.r.l., Metaponto-Matera (IT)

( * ) Notice: Subject to any disclaimer, the term of this patent is extended or adjusted under 35 U.S.C. 154(b) by 745 days.

(21) Appl. No.: 12/083,455

(22) PCT Filed: Oct. 10, 2006

(86) PCT No.: PCT/EP2006/009961
§ 371 (c)(1),
(2), (4) Date: Jun. 17, 2009

(87) PCT Pub. No.: WO2007/042327
PCT Pub. Date: Apr. 19, 2007

(65) Prior Publication Data
US 2010/0026492 A1   Feb. 4, 2010

(30) Foreign Application Priority Data
Oct. 12, 2005   (IT) .............................. MI2005A1925

(51) Int. Cl.
*G08B 13/14*   (2006.01)
(52) U.S. Cl. ................. 340/572.1; 340/10.1; 340/539.1; 47/6; 47/8
(58) Field of Classification Search .... 340/572.1–572.8, 340/539.1, 10.1; 47/6, 8, 57.5
See application file for complete search history.

(56) References Cited

U.S. PATENT DOCUMENTS

| 6,182,725 | B1 * | 2/2001 | Sorvik ......................... 144/335 |
| 6,671,698 | B2 * | 12/2003 | Pickett et al. ........................ 1/1 |
| 6,745,127 | B2 * | 6/2004 | Crosby ............................ 702/2 |
| 6,888,458 | B2 * | 5/2005 | Carlson ......................... 340/540 |
| 7,256,699 | B2 * | 8/2007 | Tethrake et al. ........... 340/572.8 |
| 7,403,855 | B2 * | 7/2008 | Fuessley et al. .................. 702/5 |
| 2001/0029996 | A1 * | 10/2001 | Robinson ........................ 141/11 |
| 2003/0218060 | A1 * | 11/2003 | Carlson ......................... 235/376 |
| 2004/0122592 | A1 |  6/2004 | Fuessley et al. |

FOREIGN PATENT DOCUMENTS
WO   WO01/97597   12/2001
* cited by examiner

*Primary Examiner* — Eric M Blount
(74) *Attorney, Agent, or Firm* — Hedman & Costigan, P.C.; James V. Costigan

(57) ABSTRACT

The invention relates to a method for the traceability of plants after field planting and during the whole productive and commercial cycle, by means of the RFID (Radio Frequency Identification) Tags technology, comprising: 1) marking of the plants by the grafting of radio-frequency microchips containing information relating to the plant it-self, directly in the trunk or other parts of the plant or by means of external systems; 2) handling and display of the traceability data by means of a suitable software system.

6 Claims, 11 Drawing Sheets

METHOD FOR THE TRACEABILITY OF PLANTS

The present invention relates to a method for the traceability of plants after field planting and during the whole productive and commercial cycle, by means of the RFID Tags (Radio Frequency IDentification) technology.

More specifically, the invention relates to a method which allows mother plants of great interest and commercial value (producers of scions) to be classified and the graft-holders starting from the seed to then subsequently trace the daughter plants deriving from the grafting of the scions on the graft-holders, with the use of an electronic labeling system.

The use of the RFID Tags (Radio Frequency IDentification) technology is becoming increasingly more widespread in both productive and commercial cycles. An RFID system consists of a transceiver (reader) and one or more Transponders capable of communicating with each other by means of a modulated radiofrequency signal.

The Tag readers/writers can be of the palm-top type (for field detection), transportable (for installation on forklift trucks and trolleys) or fixed (for controlling openings, production lines or specific activity areas) and they can read/write on one or more Tags contemporaneously, with a few limitations.

RFID Tags, also called Transponders, are substantially memories equipped with a transceiver radio apparatus, often inserted in the same silicon chip.

The system is stimulated by an external apparatus (fixed or mobile) with which it establishes a connection via radio and then returns its identification code and/or other possible information contained therein.

Rewritable Tags can also be remote-programmed with additional data or completely reprogrammed with a new "identity".

Their dimensions and their final assembly can vary according to the application and performances, even if the chip on which they are based remains the same.

The first important difference between Tags can consist of the type of memory contained therein. The least expensive use read only memories (ROM), typically of about ten bytes, which the constructor codifies beforehand with a progressive number so that it becomes univocal. In the reading phase, a data-base is therefore often necessary, from which the code used by the company is obtained. Tags with read only memories are not very flexible and are mainly used in "disposable" applications.

The market is generally oriented towards Tags with an ampler memory and of the rewritable type. The company can therefore memorize them with a code together with the desired information; they can be easily reused at the end of their cycle of use.

Tags are divided into active and passive: this is an important distinction as are also the relative technical differences and costs.

Active Tags are internally equipped with a battery. There is therefore sufficient energy for obtaining high performances in terms of radio range (up to 100 meters and over), velocity, memory quantity and for sustaining other possible accessory functions.

An example of an active Tag is the common TELEPASS which is used inside motor vehicles.

Passive Tags do not have an internal battery: the feeding necessary for their functioning derives directly from the external RF source which is communicating with the Tag, in other words, the RF energy, converted by the aerial into electric energy, it is rectified and carried to a condenser (similarly to what occurs in feeders) which then acts as a tiny battery, with a sufficient charge for completing the transaction.

In this way, it is not possible to obtain a high range radio emission; passive Tags, in fact, reach ranges which at best are a few meters. They are much cheaper than active Tags and can reach extremely limited dimensions, even in the order of a few $mm^2$ (excluding the aerial).

Examples of passive Tags are those inserted in car ignition keys: thanks to an aerial situated near the lock, the control board is able to communicate with the Tag of the key and, if it does not recognize it, it will prevent the vehicle from starting up.

RFID detection systems are finding possible applications in various industrial sectors: they are used, for example, in security systems consisting of a specific reader which recognizes or simply communicates with a limited number of Transponders. Immobilizers for motor vehicles and electronic locks for which a data collection system is not envisaged, belong to this group.

Examples of these applications are access control systems (which allow entrance to a certain environment only to authorized persons or the passage of skiers equipped with a con-validated pass through ski-lift gates), anti-counterfeit systems (a transponder inserted in a high-quality item of clothing or a bottle of perfume can confirm its authenticity) and systems based on prepaid membership cards.

Applications in integrated control systems with which radiofrequency identification associated with a complex data collection system guarantees the complete handling of the most varied of situations, are also being developed. Think, for example, of the possibility of marking, sorting and tracing at any moment the luggage of all the airports in the world, following all the production phases of a certain product.

Tags allow the identification of animals, clothes, objects or raw materials, with a univocal code memorized inside its microchip and are capable of acquiring information (i.e. of registering data inside) and making it available in real time, with suitable reading/writing systems.

According to a recent ABI Research study, the handling of livestock is also becoming of major importance among the various fields of use of RFID, following recent sanitary problems which have affected herds in Europe and all over the world.

In this respect, the US Department of Agriculture has recently launched the "National Animal Identification System (NAIS)" program for the handling of most of livestock species, which proposes the use of various identification technologies, from retina scanning to genetic identification, and RFID, which in turn has been particularly recommended by the US Animal Identification Plan's Beef and Dairy Working Groups.

Within a development program of new applications of RFID detection systems, a method has now been found which allows this technology to be also applied in the nursery field.

Operating according to the method of the invention, it is possible to identify mother plants of great interest and commercial value from which scions are removed for effecting grafting, identifying and tracing all the graft-holder story starting from the sanified and certified seed, and subsequently tracing and retracing the daughter plants also directly in the field after planting.

An object of the present invention therefore relates to a method for the traceability of plants after field planting and during the whole productive and commercial cycle, by means of the RFID (Radio Frequency Identification) Tags technology, comprising:

1) marking of the plants by the grafting of radio-frequency microchips containing information relating to the plant itself, directly in the trunk or other parts of the plant or by means of external systems;

2) handling and display of the traceability data by means of a suitable software system.

Figure 1:
FIG. 1 is a photograph which shows the making of a vertical incision with a knife in the trunk of a plant to prepare the plant to receive a radio-frequency microchip.
Figure 2:
FIG. 2 is a photograph of the same plant shown in FIG. 1 where a part of an incision in the trunk of the plant is being opened to receive a radio-frequency microchip.
Figure 3:
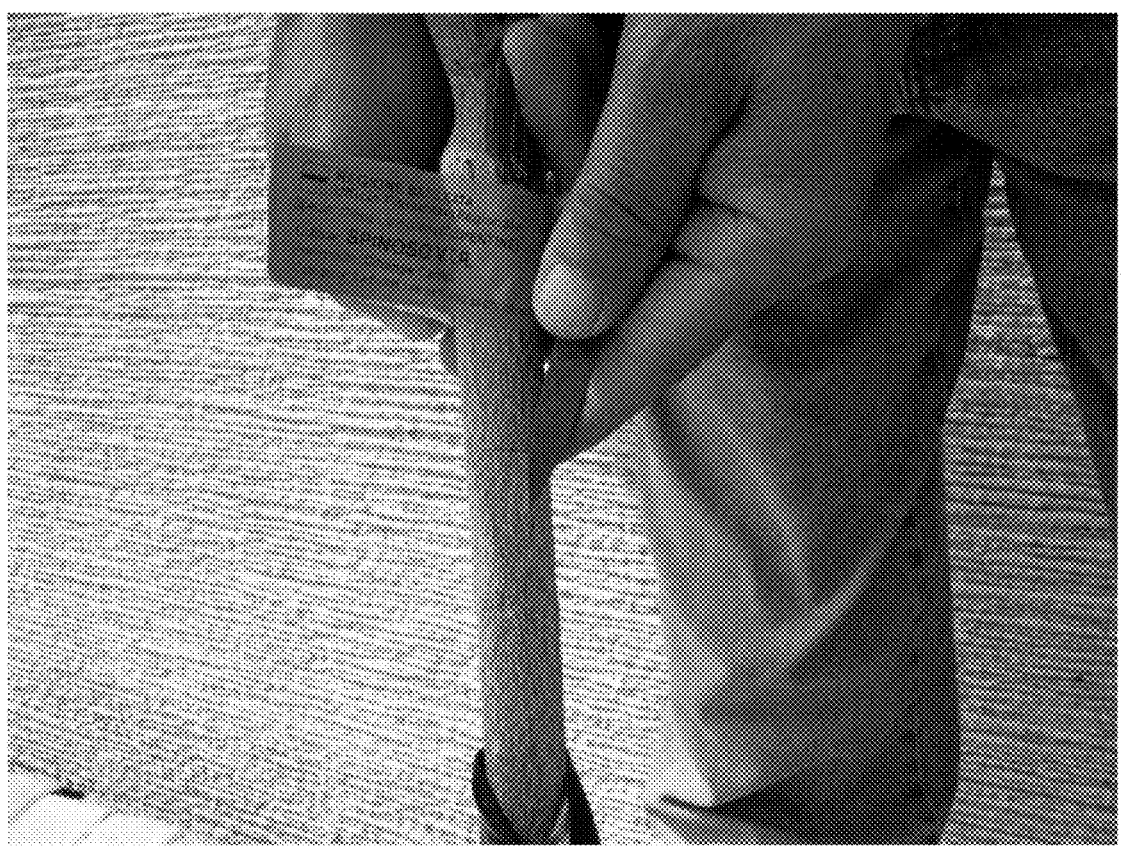
FIG. 3 is a photograph of the same plant shown in FIG. 2 where a second portion of the incision is being opened to receive a radio-frequency microchip.
Figure 4:
FIG. 4 is a photograph of the same plant shown in FIG. 3 where the radio-frequency microchip is being placed in the open incision.
Figure 5:
FIG. 5 is a photograph, the same plant shown in FIG. 4 which shows a close-up view.
Figure 6:
FIG. 6 is a photograph of the plant shown in FIG. 5 which shows the radio-frequency microchip positioned in the previously made incision.
Figure 7:
FIG. 7 is a photograph of the same plant shown in FIG. 6 which shows a close-up view.
Figure 8:
FIG. 8 is a photograph of the same plant shown in FIG. 7 which shows the radio-frequency microchip being secured in the incision with tape.
Figure 9:
FIG. 9 is a photograph of two plants in which radio-frequency microchips have been embedded and taped in place.

An application example of the RFID Tags technology in the nursery sector relates to a method which allows mother plants of great interest and commercial value to be classified and the daughter plants produced from each of these to be traced, in particular said method comprises:

the selection and cultivating of mother plants, producers of scions;

the marking of mother plants by the grafting of radio-frequency microchips containing information relating to the plant, directly in the trunk or other parts of the plant or by means of external systems;

the application of the microchip on the bulk of scions, produced by each mother plant;

the application of the microchip in the bulk of graft-holders on which information relating to the seed is to be inserted;

the insertion of the microchip directly in the trunk or other parts or insertion outside the plant in specific systems, suitably sealed at the moment of the grafting of the scion on the graft-holder for the production of the final plant;

the handling and display of the traceability data by means of a suitable software system installed on a palm-top PC, having a suitable RFID reader/writer.

The method of the invention is entirely original with respect to what has been accomplished so far and to what is being effected for nursery control and traceability and represents a real applicative model.

The innovative element consists in the possibility of experimenting and applying electronic plates on which the whole story of the reference vegetal system is recorded starting from the seed.

With respect to paper systems or plastic labels which can be interfered with or discoloured by environmental conditions, the Tag application allows the detection of the whole story in real time: in practice, all the indications are available on the plant or reference matrix and, thanks to the emission of completely harmless low frequency electromagnetic waves, they are accessible everywhere.

The process starts from an accurate selection of mother plants which are grown in a controlled environment, in order to increase the agronomical standards and eliminate possible contaminations on the part of quarantine pathogenic microorganisms such as, for example, the citrus tristeza virus (CTV).

The plants can belong to any species or variety. In the case of the present invention, the experimentation was carried out, for purely illustrative purposes without limiting its application, on citrus plants.

The radiofrequency microchip is grafted in the trunk of the plant by producing a cut underneath the cortex of the trunk and is then sealed, to guarantee rooting with plastic material for nursery use.

FIGS. 1-9 illustrate the grafting phases of the microchip, in which an incision is first made in the cortex of the trunk and the microchip, which in turn has been suitably sterilized with chemical methods so as not to interfere with the form and functionality of the microchip itself, is only inserted afterwards.

The grafting of the chip can also be effected with other systems such as syringe, pneumatic gun, mechanical pressure systems, insertion with self-threading screw systems.

Figure 10:
FIG. 10 is a photograph of a plant having a radio-frequency chip positioned with an external collar system made of plastic material.

The microchip can also be positioned with external systems such as collar systems made of plastic material or bracelet systems made of plastic material or another system which does not interfere with the radiofrequency system (FIG. 10).

Alternative methods can also be used, which envisage adhesive labels in which the microchip is contained, ring systems consisting of flexible materials which can be modeled on the growing trunk.

The microchip preserves an indelible historical trace of the plant, certifying both its origin and the phytopathologic parameters and genetic identity.

In microchips which are applied in the various stages of the method indicated above, for example, information relating to the number of plants, plant code, species, clone variety, sanitary state, origin, constitutor, transplant date, GPS coordinates, leaf and cadastral particle, position and planimetry; removal data and number of scions produced, destination and preservation; seed producer, planting data, germination and germination site, can be inserted.

In this way, the microchip indelibly preserves data relating to the plant (identification of the "mother", graft origin, date of grafting, phytosanitary state, production year, GPS coordinates, plants or seeds generated by the progenitor) inside the plant itself, thus reducing the risk of counterfeiting/degradation typical of paper or plasticized labels.

The microchip also allows data correlated to significant events which have occurred during the life of the plant to be recorded and updated.

Access to the data memorized on the chip or their modification can be limited only to qualified persons by the use of a password.

The microchips which are used in the method of the invention can have various sizes, microchips having dimensions of 4×20 mm are preferably used.

In the case of the present invention, the experimentation was carried out with microchips having the characteristics illustrated in Table 1.

These characteristics, however, should in no way be considered as limiting the scope of the invention itself.

Access to the data memorized on the chip or their updating is effected by the use of a palm-top PC equipped with a specific RFID reader/writer. It is sufficient to bring the reader close to the trunk of the plant in order to read or update the data on the chip in a protected and safe manner.

The information is also contained in the central project archives and is available via web.

The handling and display of the traceability data are effected by means of Suite Syslab® software developed by Uniteam.

With respect to other traditional methods, the application of tags allows all the necessary information to be contained in the single plants and is therefore accessible wherever these may be by simply irradiating the volume in which the tree is situated with a low frequency electromagnetic field.

With the traditional methods, it is possible for there to be delays both in the communication and registration of the data in the Central Data Bank.

With RFID, on the contrary, all the information can be inserted and read in real time, preserved and protected with time both from the action of environmental and atmospheric agents and also from human counterfeiting interventions.

The palm-top PC which can be conveniently adopted in the process of the invention can be any PC equipped with a suitable RFID reader/writer.

A typical example of a palm-top PC suitable for the purposes of the invention is an HP iPAQ rz 1710 Pocket PC with technical characteristics which are such to allow the application of the aerial system and programs necessary for reading and writing of the microchip.

The parameters capable of influencing the performances of the RFID technology which were used for activating the method of the present invention are the following:

TAG memory: with reading and writing equal to 2048 bits;

Data exchange rate between Tag and Controller adjustable between: 2, 4, 8 Kbit/sec; between Controller and Tag: 5.2 Kbit/sec;

Aerial operating radius: either short range (15-20 cm) or long range (30-70 cm) proximity systems can be used;

Multiple reading: this is functioning and the multiple reading feature is implemented by the anticollision algorithm;

Connectivity of the RFID system and its integration with the existing system: the connection with the controller takes place via interface RS232;

Functioning temperature: from −40° C. to +85° C.;

Frequency of the electromagnetic field used: 125 Khz (+/−6.0 Khz);

Power used for the signal supply and its limits: Aerial voltage+/−15 volts with absorption of 200 mA;

Respect for Regulations on electromagnetic compatibility according to EN 300-330;

Respect for Regulations on the electromagnetic emission limits: Group B according to EN 550 22

Respect for the following regulations on magnetic fields and electrostatic charges:
ENV 50140, ENV 50141;
IEC 801 802, IEC 801 804, IEC 1000-4-11, IEC 1000-4-5;

| | |
|---|---|
| Mechanical Vibration | IEC 68.2.6 |
| Schock | IEC 68.2.29 |

The method of the invention guarantees considerable benefits to consumers and institutes as it allows the following controls to be effected:

Origin of agricultural products

Production method

Processing process

Controls effected

Genetic identity of the vegetables and phytosanitary controls effected

Anagraphical data (passport)

Means of transportation and distribution of the vegetables and end-products.

Figure 11:
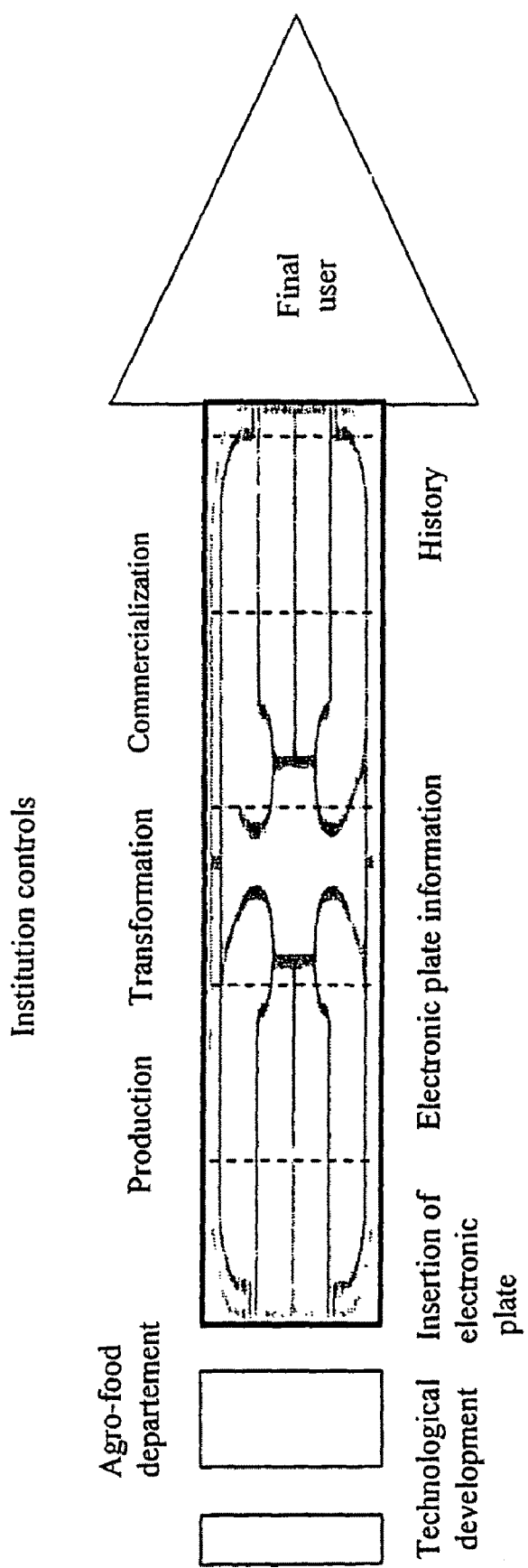
FIG. 11 is a flow chart which summarizes the cycle of developing, producing, transforming and commercializing plants according to the invention.

Consumers are therefore certain that they are buying high-quality products which have been controlled along the whole cycle as illustrated in FIG. 11.

The invention claimed is:

1. A method for the traceability of mother plants having trunks, after field planting and during a whole productive and commercial cycle, by means of RFID (Radio Frequency Identification) Tag technology in the nursery sector, comprising:

the selection and cultivating of mother plants, having trunks wherein said mother plants are producers of scions;

the marking of mother plants by the grafting of radio-frequency microchips containing information relating to each mother plant itself, directly in a trunk of said plant;

the application of the microchip on the bulk of scions, produced by each mother plant;

the application of the microchip in the bulk of graft-holders on which information relating to the seed is to be inserted;

the insertion of the microchip directly in the trunk suitably sealed at the moment of the grafting of the scion on the graft-holder for the production of the final plant;

the handling and display of the traceability data by means of a software system installed on a palm-top PC, having a RFID reader/writer.

2. The method according to claim 1, wherein the radio-frequency microchip is grafted in the trunk of the plant by producing a cut under the cortex of the trunk and it is subsequently sealed with plastic material for nursery use.

3. The method according to claim 1, wherein the microchip contains information relating to both the origin and phyto-pathologic parameters and genetic identity of the plants.

4. The method according to claim 1, wherein the microchip allows the data relating to the plant to be recorded and updated.

5. The method according to claim 1, wherein the information contained in the microchips are also preserved in a central archive and are available via web.

6. The method according to claim 1, wherein the parameters which characterize the RFID technology are the following: TAG memory: with reading and writing equal to 2048 bits; Data exchange rate between a Tag and Controller adjustable between: 2, 4, 8 Kbit/sec; between Controller and Tag: 5.2 Kbit/sec; Aerial operating radius: either short range (15-20 cm) or long range (30-70 cm) proximity systems; Multiple reading: this is functioning and a multiple reading feature is implemented by an anti-collision algorithm; Connectivity of a RFID system and its integration with the existing system: the connection with a controller takes place via interface RS232;—Functioning temperature: from −40° C. to +85° C.;

Frequency of an electromagnetic field used: 125 Khz (+/−6.0 Khz); Power used for a signal supply and its limits: Aerial voltage+/−15 volts with absorption of 200 mA; Respect for Regulations on electromagnetic compatibility according to EN 300-330; Respect for Regulations on the electromagnetic emission limits: Group B according to EN 550 22 Respect for the following regulations on magnetic fields and electrostatic charges: ENV 50140, ENV 50141; installed on a palm-top PC, having a RPM reader/writer.

* * * * *